United States Patent [19]

Tokumoto et al.

[11] Patent Number: 5,484,346
[45] Date of Patent: Jan. 16, 1996

[54] STEPLESS SPEED CHANGING APPARATUS

[75] Inventors: Yoshitomo Tokumoto, Yamatokooriyama; Osamu Sano, Kashihara, both of Japan

[73] Assignee: Koyo Seiko Co., Ltd., Osaka, Japan

[21] Appl. No.: 331,134

[22] Filed: Oct. 27, 1994

[30] Foreign Application Priority Data

Nov. 9, 1993 [JP] Japan .................................. 5-279947
Aug. 22, 1994 [JP] Japan .................................. 6-197062

[51] Int. Cl.$^6$ ............................................. F16H 15/48
[52] U.S. Cl. ........................... 475/185; 475/190; 475/193
[58] Field of Search ................................. 475/185, 190, 475/193, 194, 195

[56] References Cited

U.S. PATENT DOCUMENTS

| | | | |
|---|---|---|---|
| 4,232,561 | 11/1980 | Kashihara et al. | 475/194 |
| 4,667,525 | 5/1987 | Schottler | 475/195 X |
| 4,730,516 | 3/1988 | Kaneyuki | 475/193 X |
| 4,738,164 | 4/1988 | Kaneyuki . | |
| 4,751,854 | 6/1988 | Sakai et al. | 475/193 |
| 4,968,290 | 11/1990 | Kashihara et al. | 475/193 |

FOREIGN PATENT DOCUMENTS 61-228155  10/1986  Japan .
63-82876    4/1988  Japan .

Primary Examiner—Charles A. Marmor
Assistant Examiner—Peter Kwon
Attorney, Agent, or Firm—Darby & Darby

[57] ABSTRACT

A stepless speed changing apparatus is disclosed that has movable bodies to move in the radial direction of an input shaft, wherein stepless speed reduction is achieved with a simple configuration by converting the movement of the movable bodies into the movement of a speed change ring, and is capable of setting an appropriate mode of changing output, rotational speed and providing such a characteristic that the output rotational speed changes in the reverse manner to the change of the input rotational speed.

5 Claims, 9 Drawing Sheets

STEPLESS SPEED CHANGING APPARATUS

BACKGROUND OF THE INVENTION

1. Field of the Invention

The present invention relates to a stepless speed changing apparatus used in the transmission system of various automobile auxiliary equipment powered by, for example, an internal combustion engine.

2. Description of Related Art

Recently an automobile is equipped with a number of auxiliary equipment such as hydraulic pumps to supply hydraulic oil to a power steering device and/or an automatic speed changing apparatus, a battery charging generator and a compressor for an air conditioner. Many of these auxiliary equipment are driven by the force generated by the engine and transmitted by a belt via a crank pulley mounted at the end of a crank shaft, for example.

In the case where such auxiliary equipment is driven by directly transmitting the rotational force of the engine, considerable power loss is caused when the engine runs at a high speed. In the case where the specifications of the auxiliary equipment; are determined aiming at the minimization of the power loss, on the other hand, there arises such a problem that the auxiliary equipment cannot operate with sufficient performance when the engine runs at a low speed. Therefore, such a configuration has been employed in the prior art that a speed changing apparatus is interposed at an intermediate point of the transmission system leading to the auxiliary equipment wherein the reduction ratio of the speed changing apparatus is adjusted according to the rotational speed inputted from the engine. The driving force is directly transmitted to the auxiliary equipment when the input rotational speed is low. Speed reduction at a specified reduction ratio is carried out before the rotational speed is transmitted to the auxiliary equipment when the input rotational speed is high, thereby solving the problem described above.

Speed changing apparatuses which can steplessly change the speed have widely been used for the speed changing apparatus. This is for the purpose of preventing a sudden change in the engine load caused by the change of the reduction ratio and deterioration of driving stability. Changing of the speed reduction ratio in the speed changing apparatus is generally carried out by detecting the input rotational speed of the engine and actuating a speed changing actuator according to the detected speed. However, such a configuration results in a complicated and large-sized overall configuration of the speed changing apparatus, and hence it is difficult to secure an installation space in the transmission system and is likely to cause malfunction due to external noise.

The above discussion implies that a preferred configuration for a speed changing apparatus used in the transmission system of automobile auxiliary equipment is one capable of steplessly changing the speed ratio according to the input rotational speed using simple mechanical means. Stepless speed changing apparatuses achieving such an object are disclosed in Japanese Patent Application Laid-Open Nos. 63-82876 (1988), 61-228155 (1986) and U.S. Pat. No. 4738164.

The stepless speed changing apparatus disclosed in Japanese Patent Application Laid-Open No. 63-82876 (1988) was proposed as an application to a hydraulic pump for supplying the hydraulic oil to a power steering apparatus. An input shaft driven by the force from the engine and an output shaft driving the hydraulic pump are connected via a variable pitch pulley which changes the speed reduction ratio by changing the effective diameter thereof. A steel ball is disposed on the outside of a half of a conical body constituting the variable pitch pulley on the output shaft side. The steel ball moves outward in the radial direction under the action of the centrifugal force generated by the rotation of the output shaft, thereby pressing the half body inward, namely pressing the half body to approach another half.

With this configuration, because the effective diameter of the variable pitch pulley on the output shaft side increases as both half bodies come near to each other according to the movement of the steel ball, and the movement of the steel ball is caused by an increase in the rotational speed of the output shaft, speed reduction ratio from the input shaft to the output shaft is changed steplessly as the rotational speed of the output shaft increases.

The stepless speed changing apparatuses disclosed in Japanese Patent Application Laid-Open No. 61-228155 (1986) and U.S. Pat. No. 4738164 are basically stepless speed changing apparatuses of ring cone type, wherein an input disk which receives the input from the engine and an output disk on the output side to the auxiliary equipment are in rolling contact with a plurality of planetary cones intervening in the circumferential direction between both disks. A speed change ring is provided which is in rolling contact with all the planetary cones on the cone generating lines thereof parallel to the center axes of the input disk and the output disk, So that the positions of rolling contact with the planetary cones are changed by the movement of the speed change ring in the axial direction, thereby changing the speed reduction ratio from the input disk to the output disk steplessly. The stepless speed changing apparatuses further comprise a centrifugal drive gear pivoted on the circumference of a specified circle having the center at the axis of the centrifugal drive gear and an annular cam member having an internal gear which meshes with the outer gear of the centrifugal drive gear are disposed, wherein a roller key projecting from the speed change ring is brought into rolling contact with the cam surface of the cam member.

In such a configuration, when the centrifugal drive gear rotates about the pivot axis, the cam member in mesh therewith via the internal gear rotates to press the speed change ring via the roller key and moves in the axial direction thereby to change the speed. The centrifugal drive gear has a weight portion eccentrically located at a point in the circumferential direction with an offset from the pivot axis, and is driven to rotate about the pivot axis, so that the weight portion is located on the outside in the radial direction, by the centrifugal force which acts according to the rotation on the circle whereon it is installed. Thus the reduction ratio from the input side to the output side is changed steplessly as the rotational speed of the output side increases.

In the stepless speed changing apparatus disclosed in Japanese Patent Application Laid-Open No. 63-82876, the effective diameter of the variable pitch pulley on the output shaft side changes according to the movement of the steel ball caused by the effect of the centrifugal force thereby effecting the speed reduction. However, increasing the effective diameter of the variable pitch pulley on the output shaft side requires a force to resist the tensile Force of a transmission belt connecting the variable pitch pulleys on the output shaft and the input shaft. This force cannot be sufficiently provided by the moving force of the steel ball. This means that the speed reduction with the stepless speed changing apparatus disclosed in Japanese Patent Application Laid-Open No. 63-82876 is difficult to achieve and hence impractical.

On the other hand, the stepless speed changing apparatuses disclosed in Japanese Patent Application Laid-Open No. 61-228155 (1986) and U.S. Pat. No. 4738164 do not need a great force to move the speed change ring in the axial direction for changing the speed and carry out the operation described above without any trouble. However, these apparatuses need precision parts which require high machining accuracy such as the cam member provided with the internal gear and the centrifugal drive gear which meshes with the cam member, and have a drawback that considerable man-hours is required in the machining and assembly of these parts.

In addition, all the stepless speed changing apparatuses of the prior art constituted as described above carry out the speed changing operation in accordance to the change in the rotational speed on the output side, and are incapable of providing such a characteristic that the output rotational speed decreases as the input rotational speed from the engine increases, which is occasionally required in auxiliary equipment of automobiles.

For example, a hydraulic pump to supply hydraulic oil to a power steering device needs almost no steering assisting force when the automobile is running at a high speed due to a smaller resisting force acting on the steered tires from the road surface, and is therefore required to supply a smaller amount of oil than that supplied during low speed driving. However, a stepless speed changing apparatus of the prior art does not decrease the rotational speed of the hydraulic pump on the output side but increases the rotational speed of the hydraulic pump while decreasing the rate of increase, as the engine speed on the input side increases. Thus when the automobile is running at a high speed, the hydraulic pump is driven at a high rotational speed to supply useless hydraulic oil which is not used in assisting the steering operation. It is known that the power consumed by a hydraulic pump is approximately proportional to the cube of the rotational speed, and the loss of engine power caused by supplying the useless hydraulic oil is significant resulting in deterioration in the running performance and in the mileage of the automobile.

To sum up, a hydraulic pump for a power steering device is required to transmit the rotation without reducing speed when the input rotational speed from the engine is low, and to transmit the rotation after reducing the speed sufficiently when the input rotational speed from the engine is high, though the stepless speed changing apparatuses of the prior art are not capable of achieving such a speed changing operation.

SUMMARY OF THE INVENTION

It is an object of the present invention to overcome the above-described problems of the prior art and to provide a stepless speed changing apparatus which is capable of achieving continuous speed reduction in accordance with the changes in input rotational speed with a simple construction, and is suitable for the application to the transmission system of the auxiliary equipment of an automobile.

The stepless speed changing apparatus of the invention comprises an input shaft and an output shaft coaxially supported, an input disk and an output disk mounted at the ends on the opposing sides of the input shaft and the output shaft, respectively, a plurality of planetary cones installed in the circumferential direction of these disks so as to be in rolling contact with these disks, an axially movable speed change ring disposed substantially coaxially with the input shaft and the output shaft and being in rolling contact with all the planetary cones on the cone generating lines of the planetary cones which are approximately parallel to the center axes, a plurality of movable bodies which move in the radial direction of the input shaft under the action of the centrifugal force generated by the rotation of the input shaft, and movement conversion means in contact with the movable bodies for converting the movement of the movable bodies into the movement of the speed change ring.

Consequently, the speed change ring is pressed by the radial movement of the movable bodies to move in the axial direction thereby achieving speed reduction. The movement of the movable bodies is caused by the action of the centrifugal force accompanied with the rotation of the input shaft, and the reduction ratio which is set by the movement of the speed change ring is determined according only to the change in the rotational speed of the input side regardless of the rotational speed of the output side.

Another object of the invention is to provide a stepless speed changing apparatus which allows to set an appropriate mode of changing the output rotational speed.

The stepless speed changing apparatus of the invention is a version of the stepless speed changing apparatus described above wherein the movement converting means has a cam to move the speed change ring so as to reduce the speed, and the cam body has a cam surface arranged to face the movement range of the movable bodies and has inclination angles different in the radial direction in a cross section which includes the axis.

Therefore, because the movable bodies press the cam surface according to the inclination angle at each position during the movement, a mode for changing the reduction ratio depends on a mode for changing the inclination angles of the cam surface, and the mode of changing the output rotational speed can be appropriately set.

Further another object of the invention is to provide a stepless speed changing apparatus wherein such a characteristic that the output rotational speed changes in the reverse manner to the change in the input rotational speed.

In the stepless speed changing apparatus of the invention, the inclination angles of the cam surface with respect to the axis decrease toward an outer periphery of the input shaft.

Therefore, in a low rotational speed region where the movable bodies press the cam surface on the inner diameter side, the reduction ratio experiences a small amount of change for a given movement of the movable bodies, while in a high rotational speed region where the movable bodies press the cam surface on the outer diameter side, the amount of the change becomes greater. Thus the rotational speed of the output shaft remains high while the rotational speed of the input shaft is low and rapidly decreases as the rotational speed of the input shaft increases, resulting in such a characteristic as the output rotational speed changes in the reverse manner to the change in the input rotational speed.

Further in the stepless speed changing apparatus of the invention, the movable bodies are installed on a supporting shaft which supports the same via bearings. Thus the movable bodies rotate smoothly.

Further in the stepless speed changing apparatus of the invention, a moving distance of the movement conversion means in the axial direction is restricted by a housing. Consequently, the apparatus includes a smaller number of parts which may affect the initial position of the speed change ring, resulting in a high positioning accuracy of the initial position of the speed change ring.

The above and further objects and features of the invention will more fully be apparent from the following detailed description with accompanying drawings.

DESCRIPTION OF THE PREFERRED EMBODIMENTS

The invention will be described in detail below with reference to the drawings showing the embodiments thereof.

Figure 1:
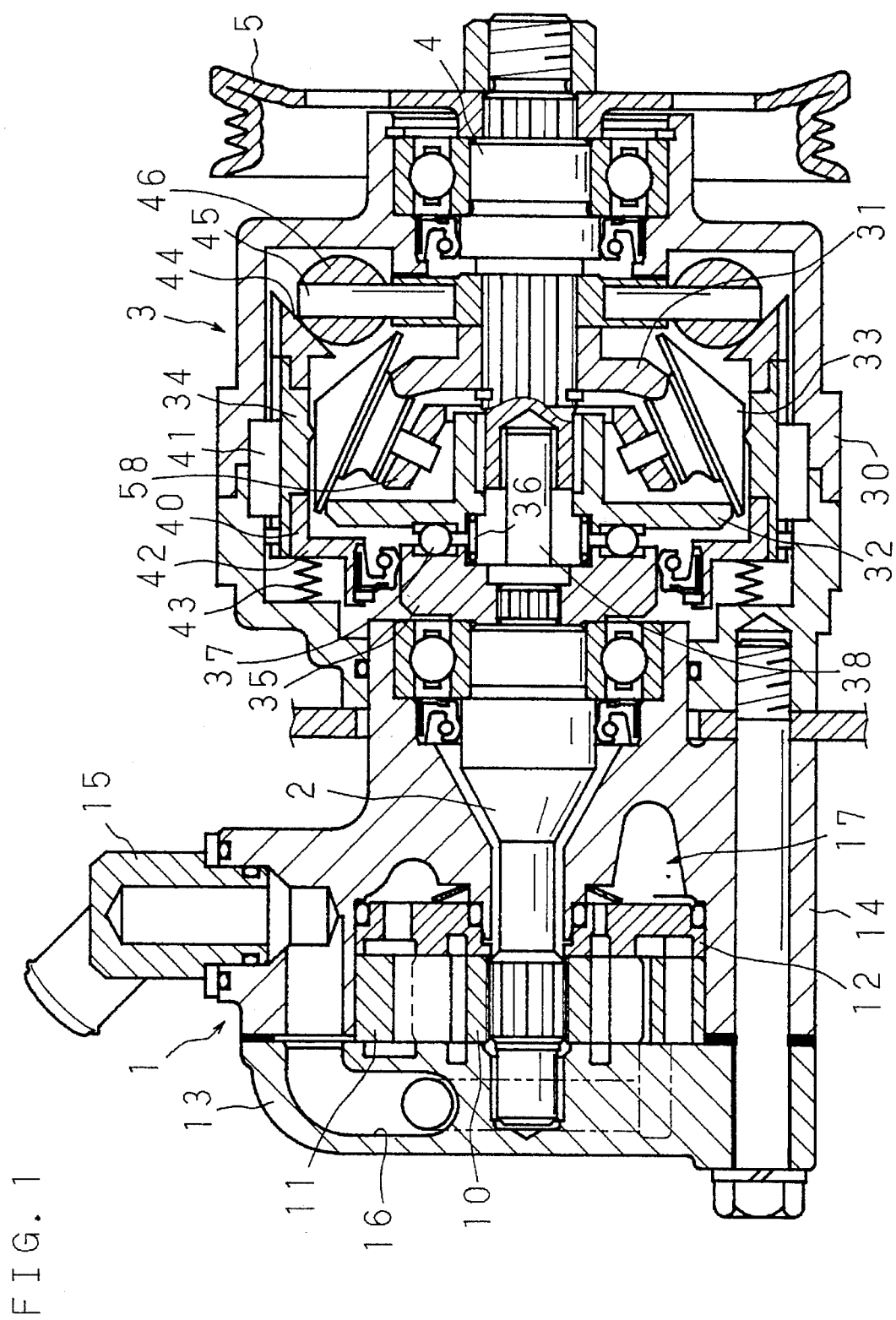
FIG. 1 is a longitudinal sectional diagram showing an application of a stepless speed changing apparatus of the first embodiment of the invention.

FIG. 1 is a longitudinal sectional diagram showing an application of a stepless speed changing apparatus of the First embodiment of the invention in a transmission system of a hydraulic pump for supplying hydraulic oil to a power steering apparatus. A hydraulic pump 1 in the drawing is a vane pump provided with a rotor 10 in a short cylindrical shape which holds a plurality of vanes freely movably to advance and retract in the radial direction and a cam ring 11 in a ring shape with an uneven wall thickness. The cam ring 11 and a pressure plate 12 positioned on one side of the cam ring 11 coaxially therewith are encased together in a pump housing 14, and the cam ring 11 is held and fixed between an end plate 13 which closes another side of the pump housing 14 and the pressure plate 12. The rotor 10 is movably fitted in the cam ring 11, and mounted on a transmission shaft 2 which penetrates the pressure plate 12, passes through the axis of the cam ring 11 and is supported at an end thereof by the end plate 13, thereby to rotate coaxially inside the cam ring 11 according to the rotation of the transmission shaft 2.

The hydraulic pump 1 constituted as described above operates to generate hydraulic pressure in a plurality of pump chambers arranged in the circumferential direction between the outer circumference of the rotor 10 and the inner circumference of the cam ring 11. These pump chambers are communicated to a suction pipe 15 installed on the upper outside of the pump housing 14 via a suction oil path 16 formed on the inner surfaces of the end plate 13 and the pump housing 14, and is also communicated to a discharge pipe not shown in the drawing via a pressure chamber 17 formed behind the pressure plate 12.

The suction pipe 15 is communicated to an oil tank not shown in the drawing which contains the hydraulic oil for the power steering apparatus and, when the rotor 10 rotates due to the rotation of the transmission shaft 2, the hydraulic oil is introduced into each pump chamber on the outside of the rotor 10 through the suction pipe 15 and the suction oil path 16. The plurality of vanes held on the rotor 10 press the tips thereof against the inner circumference of the cam ring 11 and rotate together with the rotor 10 while moving back and forth in the radial direction by following the undulation of the inner circumference, so that the hydraulic oil introduced into each pump chamber is contained in a space formed between the adjacent vanes, rotates along with the rotor 10 with the pressure being increased, and is supplied to the power steering apparatus through the pressure chamber 17 and the discharge pipe.

A stepless speed changing apparatus 3 is of the ring cone type known to those skilled in the art, wherein outer circumferences of an input disk 31 and an output disk 32 are in rolling contact with the bottom surfaces of a plurality of planetary cones 33 (only two of which are shown in the drawing) interposed between the disks in the circumferential direction. An annular speed change ring 34 installed on the circumferences of the planetary cones 33 is in rolling contact with all the planetary cones 33 on the cone generating lines thereof which are parallel to the center axes of the input disk 31 and the output disk 32. The speed changing operation is carried out by moving the speed change ring 34 in the axial direction and thereby changing the positions of the rolling contact with the planetary cones 33.

The input disk 31 is spline-coupled with an input shaft 4 coaxially supported in a transmission housing 30 thereby to rotate together with the input shaft 4. Another end of the input shaft 4 protrudes outward from the transmission housing 30 on the side opposite to the mounting side of the pump housing 14, and is connected to an output end of an engine not shown in the drawing via a V-pulley 5 mounted on the protruding end of the input shaft 4 and a V-belt not shown in the drawing wound around the V-pulley 5. Consequently, the input shaft 4 and the input disk 31 mounted thereon rotate in accordance with the rotation of the engine transmitted by the V-pulley 5.

The output disk 32 is supported by the input shaft 4 freely rotatably coaxially therewith by fitting the cylindrical portion installed on the inside thereof around the end of the input shaft 4. The end of the transmission shaft 2 extending into the transmission housing 30 from the pump housing 14 is provided with a pressure disk 35 in a thick disk shape through a spline-couple, while the pressure disk 35 is made to oppose an inner half of the output disk 32, that is, the other surface of the output disk 32 rolling contact with the planetary cones 33. Also thrust into and fixed on the pressure disk 35 at the center thereof is the base end of a support shaft 38, while the tip of the support shaft 38 is freely rotatably fitted in a support hole made at the center of the end of the input shaft 4 to an appropriate depth, so that the action of the support shaft 38 maintains the concentricity of the input shaft 4 and the transmission shaft 2.

A distance between the output disk 32 and the pressure disk 35 is maintained constant by the force of a coil spring 36 interposed between these disks. The output disk 32 and the pressure disk 35 are provided with cam surfaces inclined in the circumferential direction on specified circumferences on the surfaces thereof opposing each other, and cam balls 37 are interposed between the cam surfaces. When the output disk 32 and the pressure disk 35 start to rotate relatively to each other, the cam balls 37 engage to the respective cam surfaces to consolidate the disks and press the output disk 32 in such a direction as to depart from the pressure disk 35, namely in such a direction as to enhance the rolling contact with the planetary cones 33.

The planetary cones 33 in rolling contact with the input disk 31 and the output disk 32 are held by a carrier 58 in a conic ring shape so that the axes of the planetary cones 33 are inclined in the same direction, while the input disk 31 is in rolling contact with the bottom surfaces of the planetary cones 33 on the inner circumference and the output disk 32 is in rolling contact with the bottom surfaces of the planetary cones 33 on the periphery circumference, thereby to rotate integrally with the transmission shaft 2 which serves as the output shaft to the hydraulic pump 1, and the transmission from the input shaft 4 to the transmission shaft 2 is carried out via the planetary cones 33.

Figure 2:
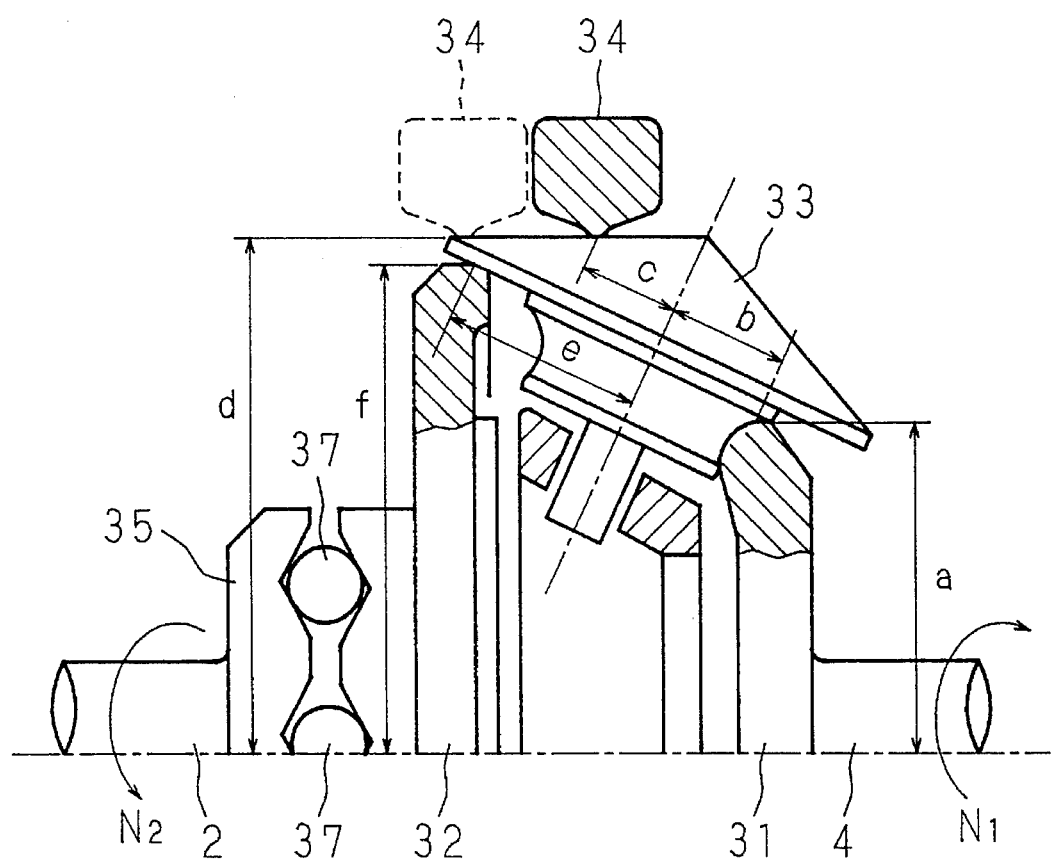
FIG. 2 is a diagram illustrating the operating principle of speed reduction in the stepless speed changing apparatus of the invention.

FIG. 2 is a drawing showing the operating principle of the speed changing operation in the ring cone type stepless speed changing apparatus 3. In the case where the position of the rolling contact between the input disk 31 and one of the planetary cones 33 is located at a distance a from the axes of the input shaft 4 and the transmission shaft 2 and at a distance b from the center of the rotation of the planetary cone 33, the position of the rolling contact between the speed change ring 34 and the planetary cone 33 is located at a distance c from the center of the rotation of the planetary cone 33 and at a distance d from the axes of the input shaft 4 and the transmission shaft 2, and the position of the rolling contact between the output disk 32 and the planetary cone 33 is located at a distance e from the center of the rotation of the planetary cone 33 and at a distance f from the axes of the input shaft 4 and the transmission shaft 2 as shown in the drawing, then rotational speed $N_2$ of the transmission shaft as the output shaft is given by the following equation which includes rotational speed $N_1$ of the input shaft 4 under the condition that the rotation of the speed change ring 34 is restricted.

$$N_2 = \frac{a(cf - ed)}{f(ac + bd)} \times N_1 \quad (1)$$

The position of the rolling contact of the speed change ring 34 is changed on the cone generating line of the planetary cone 33, and the cone generating line is parallel to the axes of the input shaft 4 and the transmission shaft 2. Consequently, the position of the rolling contact of the speed change ring 34 is changed while maintaining the distance d from the axes of the input shaft 4 and the transmission shaft 2 constant, and only the distance c from the center of the rotation of the planetary cone 33 changes. As will be apparent from the equation (1), the rotational speed $N_2$ of the transmission shaft 2 under the condition that the rotational speed $N_1$ of the input shaft 4 is constant, namely the reduction ratio of the transmission from the input shaft 4 to the transmission shaft 2 increases as the distance c decreases, and conversely decreases as the distance c increases.

For example, when c=0, namely when the position of the rolling contact of the speed change ring 34 is located at the apex of the planetary cone 33, equation (1) can be simplified as follows.

$$N_2 = -(ae/bf) \times N_1 \quad (2)$$

This equation includes only values which represent the rolling contact relationship between the planetary cone 33 and the input disk 31 or the output disk 32. In this case, namely when the position of the rolling contact of the speed change ring 34 is located at the apex of the planetary cone 33, the reduction ratio of the transmission from the input shaft 4 to the transmission shaft 2 becomes maximum. The reason of the rotational speed $N_2$ taking a negative value is because the rotating direction of the transmission shaft 2 is opposite to that of the input shaft 4.

As will be apparent from the equation (1), on the other hand, the rotational speed $N_2$ of the transmission shaft 2 takes the minimum value (=0) when the distance c satisfies the following equation.

$$c = ed/f \quad (3)$$

As will be apparent from FIG. 1, the position of the rolling contact between the output disk 32 and the planetary cone 33 is located near the periphery of the planetary cone 33 closest to the transmission shaft 2, and the distance f from the axes of the input shaft 4 and the transmission shaft 2 is substantially equal to the distance d of the position of the rolling contact of the speed change ring 34 from the axes of the input shaft 4 and the transmission shaft 2. Therefore, when the position of the rolling contact of the speed change ring 34 is changed to be corresponded to the position of the rolling contact of the output disk 32, namely to the vicinity of the periphery of the planetary cone 33 as shown by a dashed line in FIG. 2, the relationship $c \approx e$ holds so that equation (3) is approximately satisfied, and a state where the transmission shaft 2 is stationary in the rotation thereof can be achieved.

As described above, the rotational speed $N_2$ of the transmission shaft 2 increases as the position of the rolling contact of the speed change ring 34 approaches the apex of the planetary cone 33, and decreases as the position departs from the apex. This means that the reduction ratio ($N_2/N_1$) of the transmission from the input shaft 4 to the transmission shaft 2 increases as the speed change ring 34 moves to the right and decreases as the speed change ring 34 moves to the left in FIG. 1 and FIG. 2, and in the decreasing, moreover, stepless speed reduction down to a zero reduction ratio can be achieved.

As shown in FIG. 1, the speed change ring 34 is held at an intermediate position of a holding cylinder 40 which has a cylindrical shape and is movably fitted inside the transmission housing 30, in such a manner that a rim for the rolling contact with the planetary cones 33 projects inward. Fixed on the inner wall of the transmission housing 30 are a plurality of guide keys 41 arranged in the circumferential direction at substantially equal intervals. On the outer circumference of the holding cylinder 40, guide grooves are formed over the entire axial length at positions corresponding to the guide keys 41. Movable fitting of the holding cylinder 40 in the transmission housing 30 is achieved by making the guide grooves engaged with the corresponding guide keys 41. That is, the holding cylinder 40 and the speed change ring 34 are guided by the guide keys 41 and are capable of moving in the axial direction while the rotation thereof is restricted by the transmission housing 30.

On the transmission shaft 2 side, namely one side of the holding cylinder 40, a shield plate 42 in a hollow disk shape is installed. The shield plate 42 keeps an oil seal, which is fitted and held on the inner circumference thereof, in sliding contact with the outer circumference of the pressure disk 35 fitted at the end of the transmission shaft 2 thereby to seal both sides of the sliding contact position liquid-tight, and to shield the mechanism of the stepless speed changing apparatus 3 from the joint portion to the hydraulic pump 1. The shield plate 42 also holds a plurality of coil springs 43 at equal intervals in the circumferential direction on a specified circumference of the back face there of (the end face on the transmission shaft 2 side). These coil springs 43 make resilient contact with the inner wall surface of the transmission housing 30 on the side thereof opposing the back face, thereby forcing the holding cylinder 40 against the input shaft 4 side (i.e., rightward in the drawing).

Further on the periphery of the input shaft 4 side which is the other side of the holding cylinder 40, a cam surface 44 tapered to flare toward the end thereof is formed as shown in FIG. 1. To the input shaft 4, a support member is spline-coupled being adjacent to the input disk 31 on the outside. As shown in the drawing, the support member has a plurality of support levers 45 installed to project radially on the outside of a boss externally fitted to the input shaft 4, while the support levers 45 respectively support a plurality of movable bodies 46.

The movable body 46 is a steel ball having a specified weight and is supported movably in the radial direction of the stepless speed changing apparatus 3 along each of the support levers 45 which penetrates the axis of the movable body 46. Because the support levers 45 are installed projecting on the boss which is spline-coupled to the input shaft 4 and rotate as the input shaft 4 rotates, the movable body 46 supported by the corresponding support lever 45 moves outward in the radial direction under the action of the centrifugal force according to the rotation of the input shaft 4.

An end of the support lever 45 faces the cam surface 44 formed on the periphery of the holding cylinder 40 as shown in the drawing, while the movable body 46 which moves along the support lever 45 is in contact with the cam surface 44 From the inside at an intermediate position of the moving path thereof and hereafter presses the cam surface 44 outward in the radial direction under the action of the centrifugal force according to the rotation of the input shaft 4. The cam surface 44 has such an inclination as described previously, and the holding cylinder 40 having the cam surface 44 moves toward the transmission shaft 2 side (i.e., leftward in the drawing) in accordance with the pressing force of the movable body 46 against the cam surface 44.

As described above, the holding cylinder 40 and the speed change ring 34 are pressed by the radial movement of the movable body 46 and move leftward against the force of the coil springs 43, and therefore stop at a position where the pressing force of the movable body 46 and the elastic force of the coil springs 43 are in equilibrium. Because the movement of the movable body 46 is caused by the centrifugal force accompanied with the rotation of the input shaft 4, the position of the speed change ring 34 in the axial direction changes to the right or left depending on the change in the rotational speed of the input shaft 4. Also because the movement of the speed change ring 34 occurs under a condition that the rotation thereof is restricted by the guide keys 41, the reduction ratio of the transmission From the input shaft 4 to the transmission shaft 2 increases as the rotational speed of the input shaft 4 decreases, and conversely decreases as the rotational speed of the input shaft 4 increases.

Figure 3:
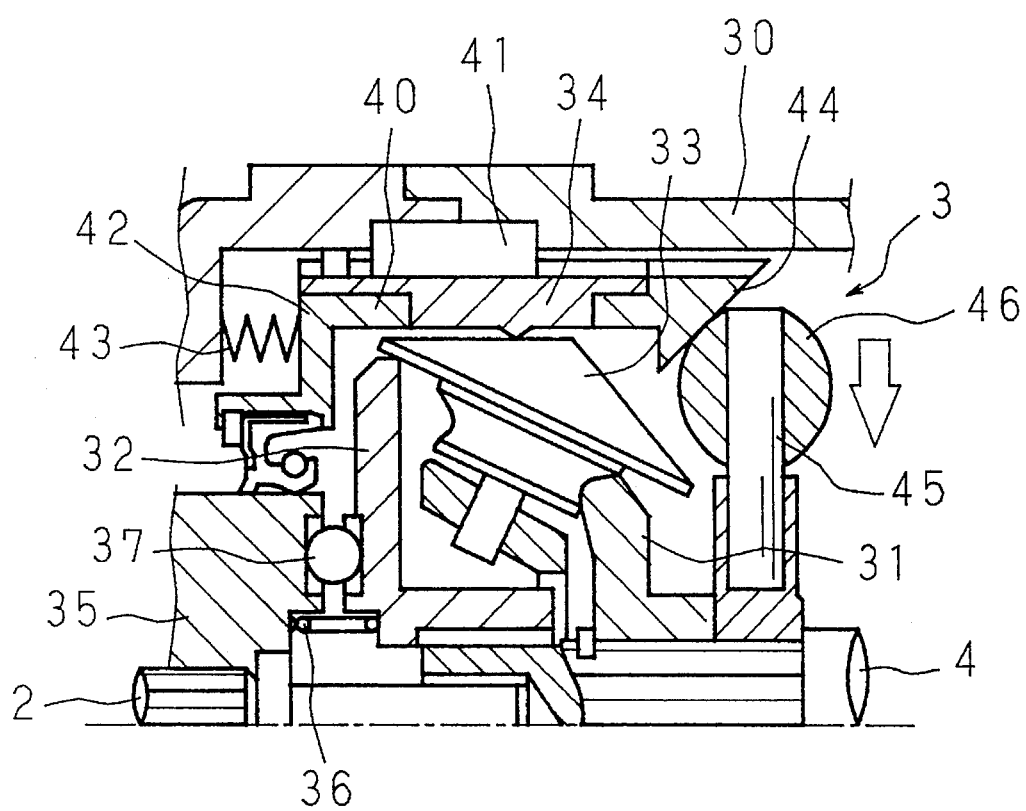
FIG. 3 is a schematic diagram showing the positional relationship among component parts of the invention in the case of a maximum reduction ratio.
Figure 4:
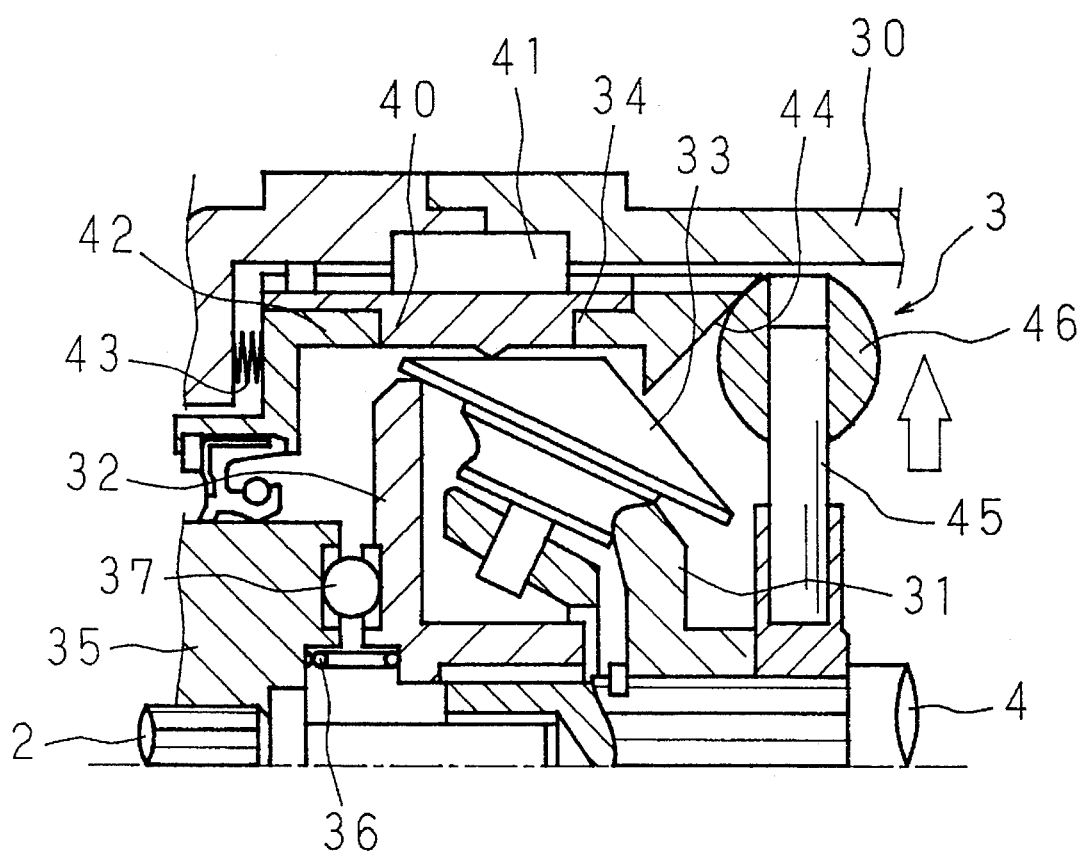
FIG. 4 is a schematic diagram showing the positional relationship among the component parts of the invention in the case of a minimum reduction ratio.

FIG. 3 and FIG. 4 show the relative positions of the components when the reduction ratio takes the maximum and minimum values, respectively. The minimum reduction ratio obtained under the condition shown in FIG. 4, namely when position of the movable body 46 in the radial direction is on the outermost side, can be achieved by appropriately setting the spring force of the coil springs 43 against the intensity of the centrifugal force estimated from the size and the weight of the movable body 46, including the case where the rotational speed of the transmission shaft 2 is zero (the case shown in the drawing is not for the zero speed).

Figure 5:
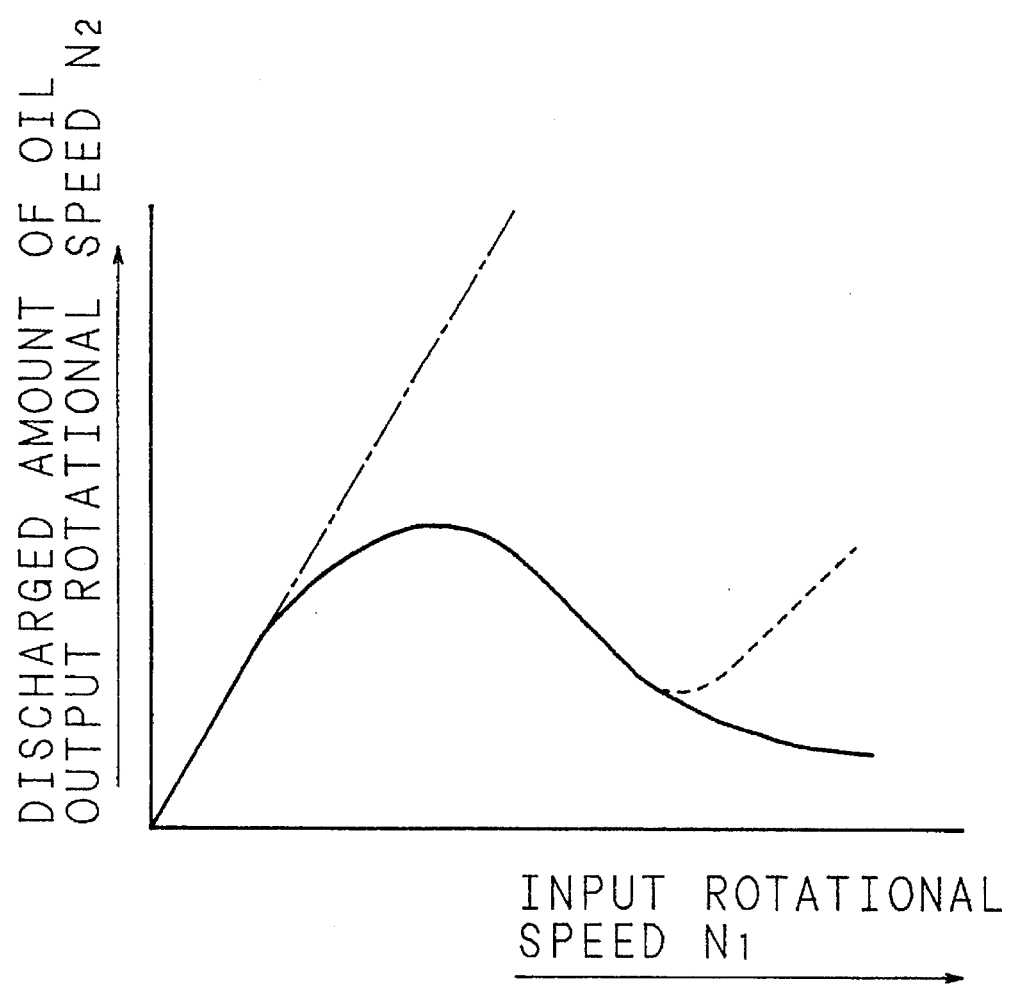
FIG. 5 is a graph showing the relationship between the input rotational speed and the output rotational speed obtained by using the stepless speed changing apparatus of the invention.

In addition, while the force of the coil springs 43 pressing the speed change ring 34 for increasing the reduction ratio is constant, the centrifugal force of the movable body 46 pressing the speed change ring 34 for decreasing the reduction ratio increases in proportion to the square of the rotational speed $N_1$ of the input shaft 4. FIG. 5 is a graph showing the relationship between the input rotational speed $N_1$ of the input shaft 4 and the output rotational speed $N_2$ of the transmission shaft 2 as the output shaft. Plotted along the ordinate is the output rotational speed $N_2$ of the transmission shaft 2 and the discharged amount of oil from the hydraulic pump 1 driven by the rotation of the transmission shaft 2, and plotted along the abscissa is the input rotational speed $N_1$. As is shown by the graph, the output rotational speed $N_2$ increases with the increase of the rotational speed $N_1$ in a region of low rotational speed $N_1$ of the input shaft 4, and conversely decreases with the increase of the rotational speed $N_1$ in a region of high rotational speed $N_1$ of the input shaft 4. Such a characteristic is desirable for the hydraulic pump 1 For a power steering apparatus as described previously.

Figure 6:
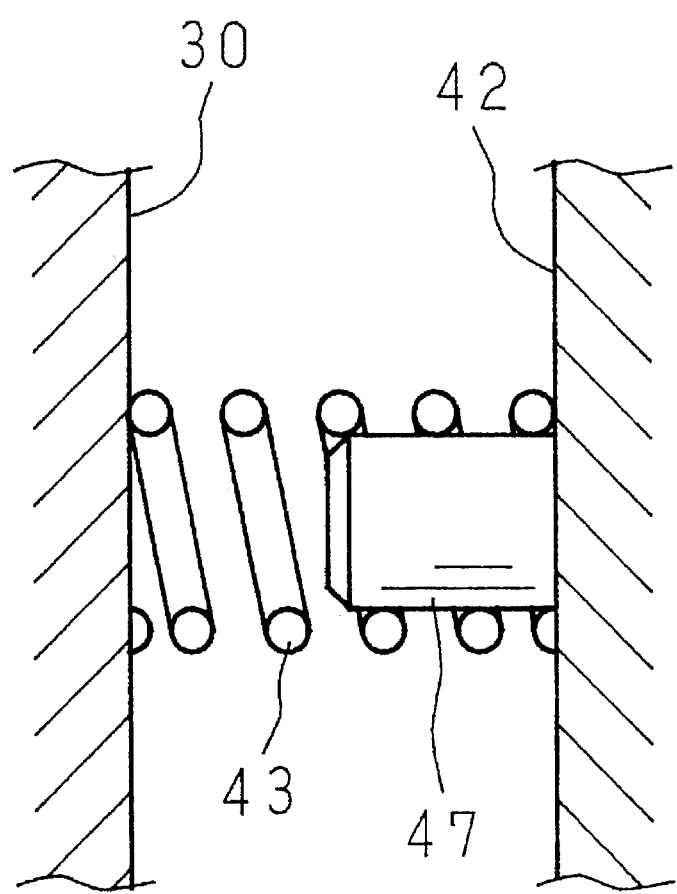
FIG. 6 is an enlarged diagram showing the holding state of a coil spring of the stepless speed changing apparatus according to the invention.

FIG. 6 is an enlarged diagram showing the holding state of one of the coil springs 43 on the shield plate 42 on one side of the holding cylinder 40. Installed on the back of the shield plate 42 is a stopper rod 47 projecting toward the opposing surface of the transmission housing 30, and the coil spring 43 is held by fitting the base end thereof to the stopper rod 47. The stopper rod 47 is in contact with the inner wall surface of the transmission housing 30 according to the contraction of the coil spring 43 due to the movement of the holding cylinder 40, thereby restricting further movement of the holding cylinder 30. Therefore, the range of the movement of the speed change ring 34 in for decreasing the reduction ratio can be limited by setting an appropriate length of the projection of the stopper rod 47, making it possible to increase the rotational speed $N_2$ from an appropriate point in the decreasing region of the rotational speed $N_2$ as shown by a dashed line in FIG. 5. This results in increasing the degree of freedom in the choice of the characteristic.

Figure 7:
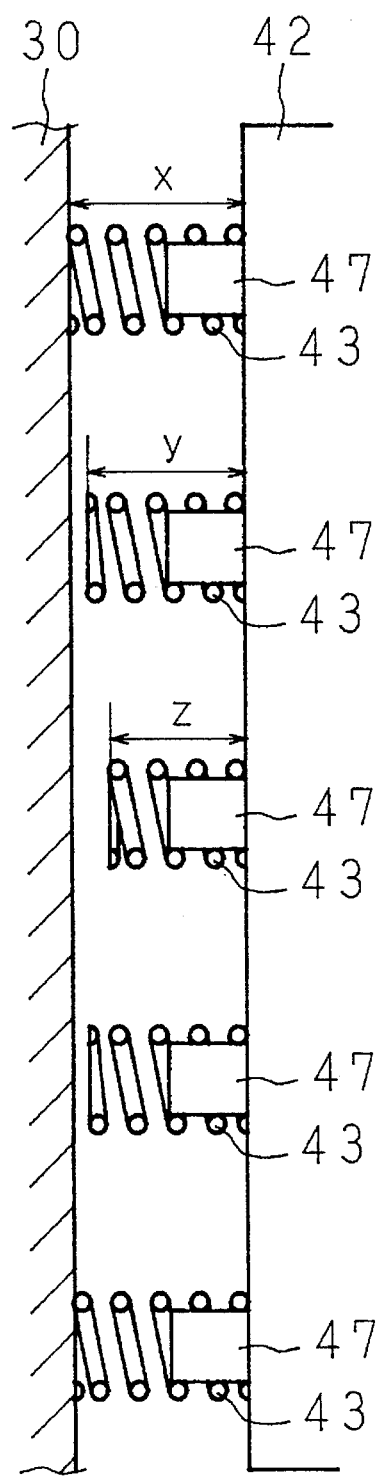
FIG. 7 is a schematic diagram showing a key portion of another embodiment of the invention.

The coil springs 43 which force the speed change ring 43 via the holding cylinder 40 to increase the speed (i.e., rightward in the drawing), can have respectively different lengths as shown in FIG. 7. FIG. 7 shows a half of the shield plate 42 which holds eight coil springs 43 arranged in the circumferential direction, and among the five coil springs 43 shown in the drawing, two coil springs 43 at the positions opposing each other in the circumferential direction have such a natural length x that is capable of always being in spring contact with the wall of the transmission housing 30, while among the other six (three of which are shown in the drawing) four (two of which are shown in the drawing) have natural length y shorter than the length x, and the remained two (one of which is shown in the drawing) have a still shorter natural length z.

With this configuration, when the speed change ring 34 moves for decreasing the speed in response to an increase in the rotational speed of the input shaft 4, the resilient force of the coil springs 43 resisting the movement increases stepwise according to the distance of the movement. Consequently, it is made possible to choose the characteristic of changing the rotational speed $N_2$ of the transmission shaft 2 and the amount of oil discharged by the hydraulic pump 1 according to the change in the rotational speed $N_1$ of the input shaft 4 with a greater degree of freedom.

Now the second embodiment of the invention will be described in detail below with reference to the accompanying drawings showing the same.

Figure 8:
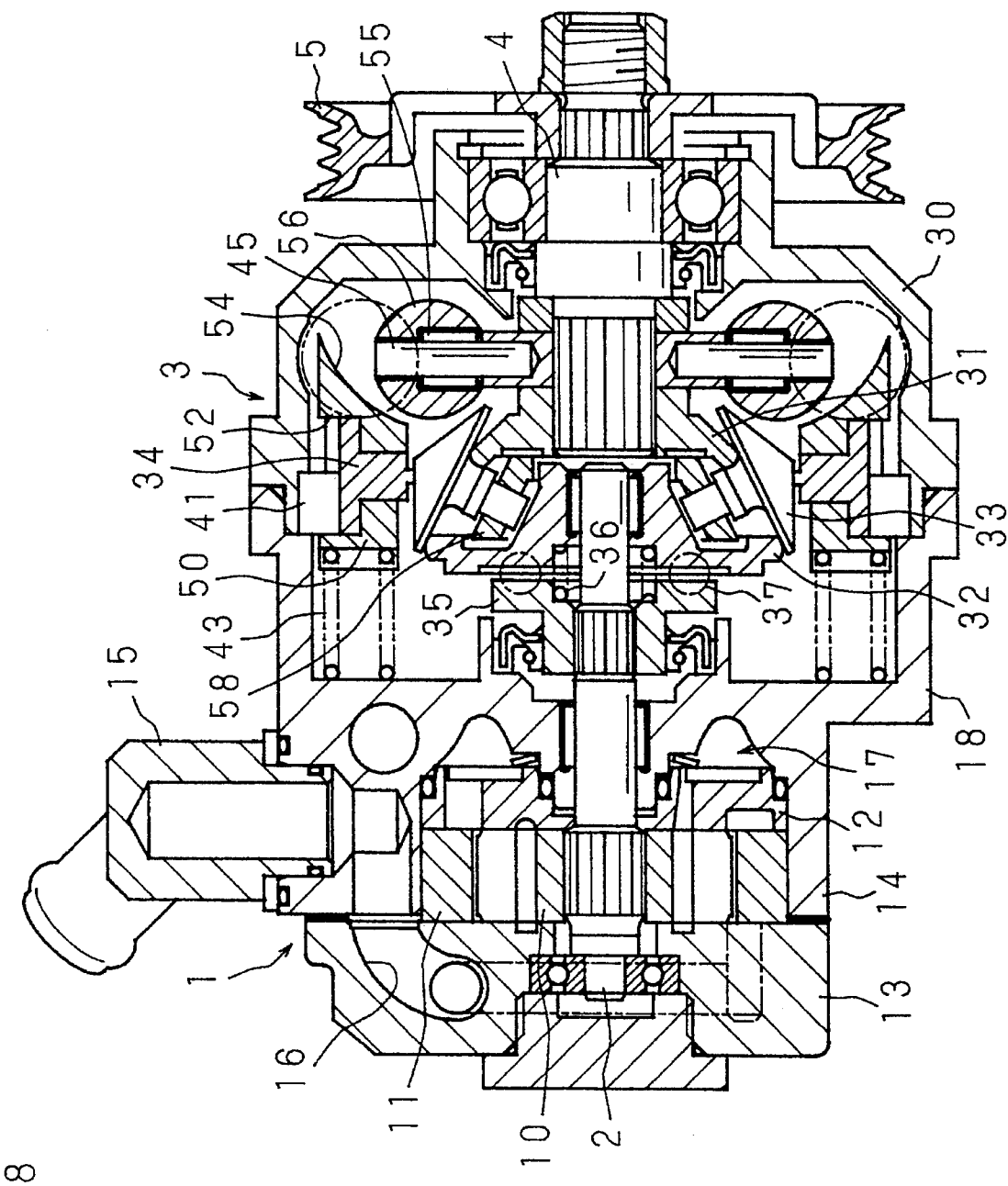
FIG. 8 is a longitudinal sectional diagram showing an application of a stepless speed changing apparatus of the second embodiment of the invention.

FIG. 8 is a longitudinal sectional view showing an application of a stepless speed changing apparatus of the second embodiment of the invention, in the transmission system of a hydraulic pump for supplying hydraulic oil to a power steering apparatus. Parts similar to those of the stepless speed changing apparatus of the first embodiment will be identified by the same reference numerals with description thereof being omitted, and parts different from those used in the first embodiment will be described below. In the drawing, the pump housing 14 has a cylindrical linkage bracket 18 installed coaxially projecting on the opposite side of a portion closed by the end plate 13, and the stepless speed changing apparatus 3 of the invention is constituted inside the transmission housing 30 assembled coaxially on an end face of the linkage bracket 18.

An end of the input shaft 4 is in butt contact with the end of the transmission shaft 2 projecting into the transmission housing 30, and the output disk 32 is fitted around the end of the transmission shaft 2 via a needle roller bearing to be supported freely and coaxially rotatably. On the projecting portion of the transmission shaft 2, the pressure disk 35 in a thick disk shape is spline-coupled, and the pressure disk 35 is made to oppose the back side of the output disk 32, namely the other surface thereof from that in rolling contact with the planetary cones 33.

The speed change ring 34 is held integrally at an intermediate portion of a cylindrical cam body 50, which is movably fitted in the transmission housing 30, so that the rim thereof in rolling contact with the the planetary cones 33 projects inward. Fixed on the inner circumference of the transmission housing 30 which opposes the outer circumference of the cam body 50 are a plurality of the guide keys 41 at substantially equal intervals in the circumferential direction, and a plurality of guide grooves 52 are formed at positions corresponding to the respective guide keys 41 so that movable fitting of the cam body 50 onto the transmission housing 30 is achieved by making the guide grooves 52 engage with the guide keys 41, respectively. Thus the rotation of the cam body 50 and the speed change ring 34 are restricted by the transmission housing 30 and are guided by the guide keys 41, and therefore can move only in the axial direction within the range where the guide grooves 52.

One side face of the cam body 50 opposes the outer wall surface of the pump housing 14, and interposed between these opposing surfaces are a plurality of the coil springs 43 at equal intervals in the circumferential direction. These coil springs 43 force the cam body 50 toward the input shaft 4 (i.e., rightward in the drawing), and restrict each of the guide grooves 52 in such a state that, the other side thereof is in contact with the end of each guide key 41 as shown in the drawing.

On the other hand, a cam surface 54 is formed on the other end face (on the input shaft 4 side) of the cam body 50. The cam surface 54 shown in the drawing is constituted such that the inclination angle with respect to the axis continuously decreases toward the outside in the radial direction of the cam body 50 in a cross section which includes the axis of the input shaft 4 (and the transmission shaft 2). Such a cam surface 54 can be constituted as either an arc having its center on the axis, a collection of arcs, or a part of a parabola having its vertex on the axis in the above-described cross section.

On the other hand, the input shaft 4 has a plurality of the support levers 45 installed to project radially outward from the boss which is spline-coupled to the input shaft 4 adjacent to the input disk 31, and movable bodies 56 are supported by the corresponding support levers 45.

The movable body 56 is a steel ball having a specified weight and is supported rotatably without resistance about the axis of the support lever 45 and movably in the radial direction by making a fitting hole passing through the axis of the movable body 56 engaged around the corresponding support lever 45 via a needle roller bearing 55 as shown in the drawing. Because the support levers 45 are installed so as to project from the boss which is spline-coupled to the input shaft 4 and rotate as the input shaft, 4 rotates as described previously, the movable body 56 supported by the corresponding support lever 45 moves outward in the radial direction of the input shaft 4 under the action of the centrifugal force as the input shaft 4 rotates.

The ends of each support lever 45 faces the cam surface 54 formed on the end face of the cam body 50, while the movable bodies 56 move along the respective support levers 45 under the effect of the centrifugal force and, at an intermediate point of the moving path, the movable bodies 56 are brought into contact with the cam surface 54 from the inside thereof. Before such a contact is made, the cam body 50 is restricted in such a state that the end faces of the guide grooves 52 formed on the outer circumference thereof are pressed against the guide keys 41 and the speed change ring 34 integrally held by the cam body 50 maintains the position of rolling contact nearest to the apex of the planetary cones 33 on the cone generating lines thereof as shown in FIG. 1, resulting in the maximum reduction ratio, so that the hydraulic pump 1 is driven at a speed near the rotational speed $N_1$ of the input shaft 4.

On the other hand, after the movable bodies 56 are brought into contact with the cam surface 54, the centrifugal force acting on the movable bodies 56 is applied to the cam surface 54 outward in the radial direction. The cam surface 54 is inclined with respect to the line of action of the centrifugal force, while a component of the centrifugal force of the movable body 56 acts upon the cam surface 54 so that the cam body 50 moves in the axial direction in resistance to the force of the coil springs 43 by the action of the component force and stops at a position where the component force and the force of the coil springs 43 are in equilibrium. At this moment, while the movable bodies 56 are rotating as the input shaft 4 rotates and the cam surface 54 is not rotating by being restricted by the cam body 50, the movable bodies 56 are supported by the respective support shafts 45, 45, . . . via the needle roller bearings 55 to be capable of rotating without resistance as coiling contact with the cam surface 54 is made, thereby causing the movement of the movable bodies 56, 56, . . . under the action of the centrifugal force to be carried out smoothly.

As described above, the movement of the movable bodies 56 is caused by the action of the centrifugal force accompanied with the rotation of the input shaft 4, and this movement accompanies the displacement in the axial direction of the cam body 50 and the speed change ring 34 which is integrally combined therewith. This displacement occurs in such a direction as to move the position of the rolling contact of the speed change ring 34 away from the apexes of the planetary cones 33, namely in such a direction that the reduction ratio of the transmission from the input shaft 4 to the transmission shaft 2 decreases. And the reduction ratio increases as the rotational speed $N_1$ of the input shaft 4 decreases and conversely decreases as the rotational speed $N_1$ of the input shaft 4 increases.

Figure 9:
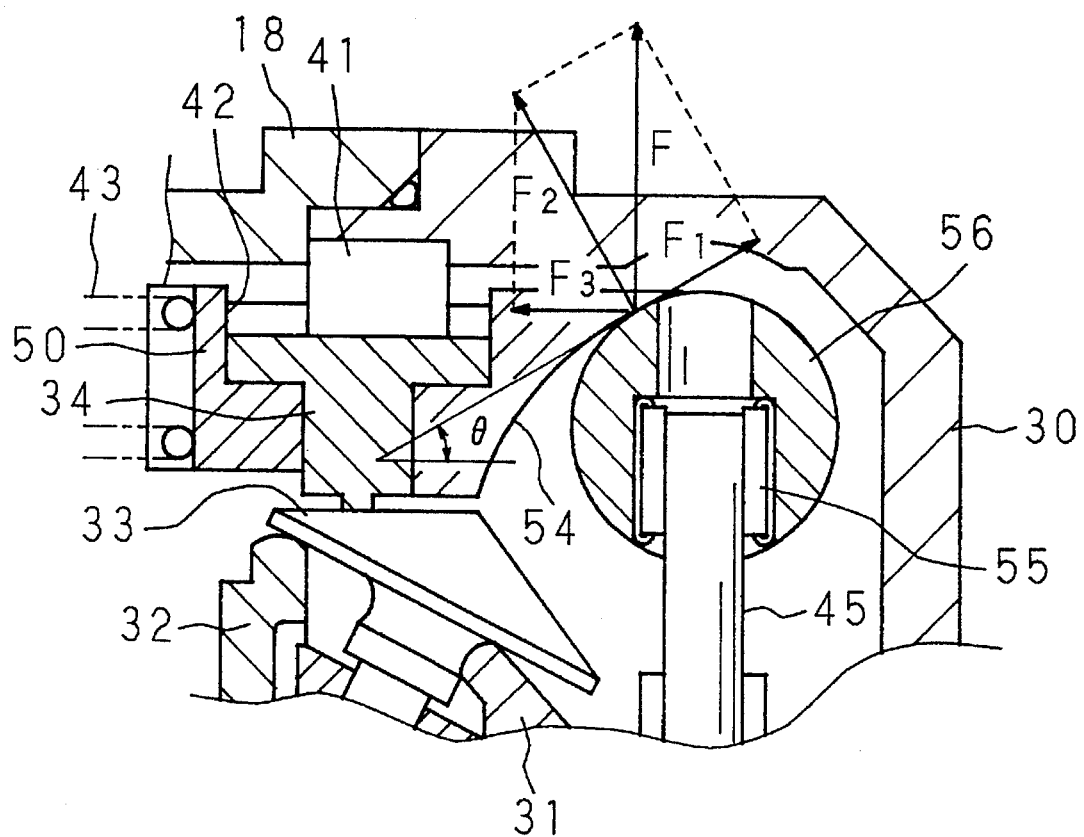
FIG. 9 is an enlarged diagram of the vicinity of a contact position between a movable body and a cam surface in the second embodiment.

FIG. 9 is an enlarged diagram of the vicinity of contact position of the movable body 56 and the cam surface 54. The mechanism of generating the component force in the axial direction on the cam surface 54 will be described below with reference to this drawing. The centrifugal force F acting on the movable body 56 is decomposed into a component $F_1$ directed along the cam surface 54 and a component $F_2$ directed at right angles to the cam surface 54 at the point of contact with the cam surface 54, and the cam surface 54 is pressed in the axial direction by a horizontal component $F_3$ of the component $F_2$.

The horizontal component $F_3$ can be obtained from the following equation which includes an inclination angle $\theta$ of the cam surface 54 with respect to the horizontal direction (the axial direction of the input shaft 4 and the transmission shaft. 2) at the point of contact with the movable body 56.

$$F_3 = F \cdot \sin\theta \cdot \cos\theta \quad (4)$$

As will be apparent from equation (4), the horizontal component $F_3$ under the action of a constant centrifugal force F takes a maximum value when the inclination angle $\theta$ is 45°, and remains substantially constant when the inclination angle remains within a specified range around 45° this value. Out, of this range, the horizontal component $F_3$ sharply decreases as the inclination angle $\theta$ decreases (or increases). In the invention, the inclination angle $\theta$ of the cam surface 54 with respect to the axis has such a distribution as to continuously decrease from the inside to the outside of the cam body 50 in the radial direction as described previously, and the changing rate of the horizontal component $F_3$ acting on the cam surface 54 sharply decreases as the point of contact of the movable body 56 moves toward the outer diameter side of the cam surface 54 when the inclination angle $\theta$ on the outside is set sufficiently small.

The centrifugal force F changes in proportion to the square of the rotational speed $N_1$ of the input shaft 4 and rapidly increases as the point of contact of the movable body 56 moves toward the outer diameter side of the cam surface 54. Therefore, the horizontal force $F_3$ given by equation (4) can be set appropriately over the entire movement range of the movable body 56 according to the choice of the inclination angle $\theta$ of the cam surface 54.

Because the cam surface 54 has the inclination angle $\theta$ as described previously, the distance of the movement of the cam body 50 caused by the action of the horizontal component $F_3$ as described above increases as the position of the movable body 56 moves toward the outer diameter side. Therefore, the rate of the change of the distance of the movement of the cam body 50 and the speed change ring 34, which is integrally combined therewith, caused by the movable body 56 pressing against the cam surface 54, increases as the rotational speed $N_1$ of the input shaft 4 increases.

In the sequence described above, the transmission from the input shaft 4 to the transmission shaft 2 is carried out as follows: first, the rotation of the input shaft 4 makes the movable bodies 56 start to move and, until the movable bodies 56 come in contact with the cam surface 54 and after the contact till the component F3 in the axial direction acting on the cam surface 54 exceeding the spring force of the coil springs 43, the maximum reduction ratio is maintained as described previously. Thereafter the transmission is carried out while decreasing the reduction ratio as the input rotational speed $N_1$ increases, and the rate of decreasing the reduction ratio increases as the input rotational speed $N_1$ increases.

Consequently, although the rotational speed $N_2$ of the transmission shaft 2 which is the output shaft increases as the rotational speed $N_1$ increases when the rotational speed $N_1$ of the input shaft 4 is low, the rate of increase decreases continuously after the rotational speed $N_1$ of the input shaft 4 reaches a specified value and. When the rotational speed $N_1$ of the input shaft 4 is high, the output rotational speed $N_2$ decreases as the rotational speed $N_1$ of the input shaft 4 increases. As described above and as shown in FIG. 5, the amount of oil discharged by the hydraulic pump 1 driven by the rotation of the transmission shaft 2 increases as the rotational speed $N_1$ of the input shaft 4 increases when the rotational speed $N_1$ of the input shaft 4 is low, and conversely decreases as the rotational speed $N_1$ of the input shaft 4 increases when the rotational speed $N_1$ of the input shaft 4 is high. Such a characteristic is desirable for the hydraulic pump 1 used in a power steering apparatus as described previously. Also as in the case of the first embodiment, the range of the movement of the speed change ring 34 can be restricted by means of the coil springs 43, resulting in increasing the degree of freedom in choosing the characteristic.

Although there is a possibility of excessive load being applied to the movable body 46 and to the support lever 45 in the first embodiment because the movable bodies 46 are always in contact with the cam surface 44 in that case, the movable body 56 and the cam surface 54 are normally not in contact with each other in the second embodiment and are brought into contact when the rotational speed of the input shaft 4 increases, and therefore the movable body 56 does not receive excessive load. Further, although the speed change ring 34 imparts the moving force to the movable body 56 by means of the coil springs 43 in the first embodiment and therefore the initial position of the speed change ring 34 is affected by the dimensional accuracy of many parts such as the support lever 45, the movable body 56 and the input shaft 4, the moving force is applied to the transmission housing 30 in the second embodiment and therefore the positioning accuracy of the initial position of the speed cha ge ring 34 is high.

Moreover the movable body 56 can rotate smoothly in the second embodiment because the movable body 56 is fitted via the needle roller bearing 55.

The cam surface 54 in the second embodiment may have a configuration that the inclination angle with respect to the axis increases from the inner diameter side toward the outer diameter side of the cam body 50, and also such a change in the inclination angle can be discretely. By changing the inclination angle discretely, the scope of the applications of the present apparatus can be expanded.

Although applications to the hydraulic pump 1 for supplying hydraulic oil to a power steering apparatus have been described in the above embodiments, applications of the invention are not limited to this. Further, although applications as speed changing apparatus for the stepless speed changing apparatus 3 are described in the above embodiments, the stepless speed changing apparatus 3 may also be used as a speed increasing apparatus and it is needless to say that the invention has similar effects when applied to a speed increasing apparatus.

As described in detail above, in the stepless speed changing apparatus of the inventions the movement of the movable body in the radial direction, which is caused by the action of the centrifugal force generated by the rotation of the input shaft, is converted into a movement in the axial direction of the speed change ring of the stepless speed changing apparatus of ring cone type thereby to achieve the speed reduction. Therefore, the stepless speed reduction according to the change in the input rotational speed can be surely achieved with a simple configuration and, at the same time, it is possible to decrease the output rotational speed as the input rotational speed increases. Also because the cam surface for converting the movement of the movable body into the movement of the speed change ring in the axial direction has different inclination angles with respect to the axis at various positions in the radial direction which is the moving direction of the movable body, a mode for increasing the output rotational speed according to the increase in the input rotational speed can be appropriately set.

Further, in the case where the inclination angle is set so as to decrease from the inner diameter side toward the outer diameter side of the cam surface, the change in the reduction ratio to a given movement of the movable body is small in the low rotational speed region where the input rotational speed is low, and the change in the reduction ratio to a given movement of the movable body becomes greater in the high rotational speed region. Thus such characteristics, as the output rotational speed changes in the reverse manner to the change in the input rotational speed, which is required of the auxiliary equipment for automobiles powered by the engine, such as a hydraulic pump for supplying hydraulic oil to a power steering apparatus, can be easily obtained. Therefore the invention has excellent effects such as the capability of freely setting the driving characteristics of the auxiliary equipment for automobiles.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A stepless speed changing apparatus, comprising:

an input shaft and an output shaft supported coaxially;

an input disk and an output disk mounted on opposing ends of said input shaft and said output shaft, respectively;

a plurality of planetary cones disposed in the circumferential direction of said input disk and the output disk and being in rolling contact with the outer circumferences of said input disk and said output disk;

a speed change ring movable in the axial direction thereof which is arranged substantially concentrically with the axes of said input shaft and said output shaft and are in rolling contact with all of said planetary cones on the cone generating lines of said planetary cones substantially parallel to said axes;

a plurality of movable bodies which move in the radial direction of said input shaft under the action of the centrifugal force due to rotation of said input shaft; and movement converting means in contact with said movable bodies for converting the movement of said movable bodies into the movement of said speed change ring.

2. A stepless speed changing apparatus according to claim 1, wherein said movement converting means includes a cam for moving said speed change ring in such the direction as speed reduction, and said cam has a cam surface arranged to face the movement range of said movable bodies and having inclination angles with respect to said axis different in said radial direction in a section which includes said axis.

3. A stepless speed changing apparatus according to claim 2, wherein the inclination angles of said cam surface with respect to said axis decrease toward an outer periphery of said input shaft.

4. A stepless speed changing apparatus according to claim 1, wherein said movable bodies are mounted on a support shaft which supports the same via a bearing.

5. A stepless speed changing apparatus according to claim 1, wherein said movement converting means has the distance of movement thereof in the axial direction restricted by a housing.

\* \* \* \* \*